United States Patent
Lee (10) Patent No.: US 9,495,687 B2
(45) Date of Patent: Nov. 15, 2016

(54) PROTECTIVE COVER WITH INFORMATION DISPLAY FUNCTION

(71) Applicant: ASIA VITAL COMPONENTS CO., LTD., New Taipei (TW)

(72) Inventor: Dasheng Lee, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 256 days.

(21) Appl. No.: 14/269,208

(22) Filed: May 5, 2014

(65) Prior Publication Data

US 2015/0317669 A1 Nov. 5, 2015

(51) Int. Cl.
  *G06Q 30/02* (2012.01)
  *H04M 1/18* (2006.01)
  *H04M 1/02* (2006.01)

(52) U.S. Cl.
  CPC .......... *G06Q 30/02* (2013.01); *G06Q 30/0241* (2013.01); *H04M 1/185* (2013.01); *H04M 1/0283* (2013.01)

(58) Field of Classification Search
  CPC . G06Q 30/02; G06Q 30/0241; H04M 1/185; H04M 1/0283
  USPC .............. 361/679.01–679.03; 705/7.29–7.39, 705/14.1–14.73
  See application file for complete search history.

(56) References Cited

U.S. PATENT DOCUMENTS

| | | | |
|---|---|---|---|
| 2011/0226859 A1* | 9/2011 | Chen ................ | G06K 19/07703 235/492 |
| 2013/0092740 A1* | 4/2013 | Lee ................. | G06K 19/07767 235/492 |
| 2013/0235446 A1* | 9/2013 | Leoni ................ | G06K 19/077 359/296 |
| 2014/0162729 A1* | 6/2014 | Garden ............... | H04B 1/3888 455/566 |
| 2014/0323182 A1* | 10/2014 | Kim ................. | H04B 1/3888 455/566 |
| 2015/0015443 A1* | 1/2015 | Lee ................. | H01Q 1/243 343/702 |
| 2015/0085433 A1* | 3/2015 | Kim ................. | G06F 1/1641 361/679.01 |

FOREIGN PATENT DOCUMENTS

| | | |
|---|---|---|
| TW | M342776 U | 10/2008 |
| TW | 201142770 A | 12/2011 |
| TW | M444075 U | 1/2013 |
| TW | 201411439 A | 3/2014 |
| TW | M485479 U | 9/2014 |
| WO | 2011001024 A1 | 1/2011 |

* cited by examiner

*Primary Examiner* — Anthony Haughton
*Assistant Examiner* — Yahya Ahmad
(74) *Attorney, Agent, or Firm* — C. G. Mersereau; Nikolai & Mersereau, P.A.

(57) ABSTRACT

A protective cover with information display function includes a main body, at least one receiving unit provided on the main body, and at least one sheet of e-paper. The main body has an opening formed on and sunk from one side of the main body, and an object to be protected can be fitted into the opening and safely covered by the main body. The receiving unit is wirelessly connected to an external interface for receiving an electromagnetic wave. The e-paper is selectively provided on the main body or the receiving unit and is electrically connected to the receiving unit, and can be driven by the electromagnetic wave to display information thereon. With the main body having the receiving unit and the e-paper provided thereon, the protective cover can effectively provide the function of displaying advertisement and other information at any place in real time.

12 Claims, 11 Drawing Sheets

PROTECTIVE COVER WITH INFORMATION DISPLAY FUNCTION

FIELD OF THE INVENTION

The present invention relates to a protective cover, and more particularly to a protective cover with information display function, which can display real-time information to enable upgraded advertising effect.

BACKGROUND OF THE INVENTION

An advertisement is a form of paid, unidirectional announcement in or on some mass media. The advertiser's name is shown in the advertisement, and messages in the advertisement are provided by the advertiser under control. The advertisement can be made for different purposes, such as publicizing, public relations, product placement, sponsoring, underwriting, sale promotion and the like. Currently, there are many different media that advertisers can use, including television programs, broadcast programs, movies, magazines, newspapers, Internet, bulletin boards and so on.

However, when presenting an advertisement or a notice in or on the currently available media for marketing purpose, a user could not always receive in real time the advertisement or the notice, such as a promotional price of some merchandise or some discount ticket rate or a rapid transit stop operation notice. As a result, the user might very possibly miss such information and the chance to buy or use things with the favorable price, and the advertisers might lose good business opportunities to sell more products.

To pass the advertisement or notice to users in real time, some businesses try to manually hand out leaflets in public places, such as in streets or downtown, so that persons who get the leaflets can immediately know the currently available promotional activities. While the leafleting is able to pass the advertising information to users in real time, it obviously fails to provide significant marketing effect and requires considerably high labor cost. Thus, it is still an important issue for businesses as how to widely pass advertising and noticing information to general users in real time.

In brief, the traditional advertising forms have the following disadvantages: (1) failing to pass the advertising or noticing information to users in real time; (2) requiring high cost; and (3) failing to provide upgraded advertising effect.

It is therefore tried by the inventor to develop a protective cover with information display function to overcome the disadvantages of the traditional advertising forms.

SUMMARY OF THE INVENTION

A primary object of the present invention is to provide a protective cover with information display function, which can display information in real time and enable upgraded advertising effect.

Another object of the present invention is to provide a protective cover with information display function, which can display real-time information and advertisement at reduced cost.

To achieve the above and other objects, the protective cover with information display function according to the present invention includes a main body, at least one receiving unit, and at least one sheet of e-paper. The main body has an opening formed on and sunk from one side thereof. The at least one receiving unit is provided on the main body. The at least one sheet of e-paper can be provided on the main body or the receiving unit, and is electrically connected to the receiving unit for displaying at least one piece of information. The receiving unit receives an electromagnetic wave from an external interface and transmits the received electromagnetic wave to the e-paper, so that the e-paper is driven by the electromagnetic wave to display information thereon, allowing a user to view the information in real time. Further, the protective cover can effectively achieve the effect of showing advertisements and providing information at reduced cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and with reference to the accompanying drawings. For the purpose of easy to understand, elements that are the same in the preferred embodiments are denoted by the same reference numerals.

The present invention provides a protective cover with information display function. For the purpose of conciseness, the present invention is also briefly referred to as the protective cover herein. Please refer to FIGS. 1 and 2, which are exploded and assembled perspective views, respectively, of the protective cover of the present invention according to a first preferred embodiment thereof. As shown, in the first preferred embodiment, the protective cover includes a main body 1, at least one receiving unit 2, and at least one sheet of e-paper 3. The main body 1 is made of a polymeric material, such as elastomeric plastics or rubber, and has a first side 11, a second side 12, a third side 13 and a fourth side 14 defined thereon. In the illustrated first preferred embodiment, the first and the second side 11, 12 are respectively a top and a bottom side of the main body 1, and the third and the fourth side 13, 14 are two opposite lateral sides of the main body 1. The main body 1 also has an opening 16 formed on and sunk from one of the four sides 11-14.

Figure 1:
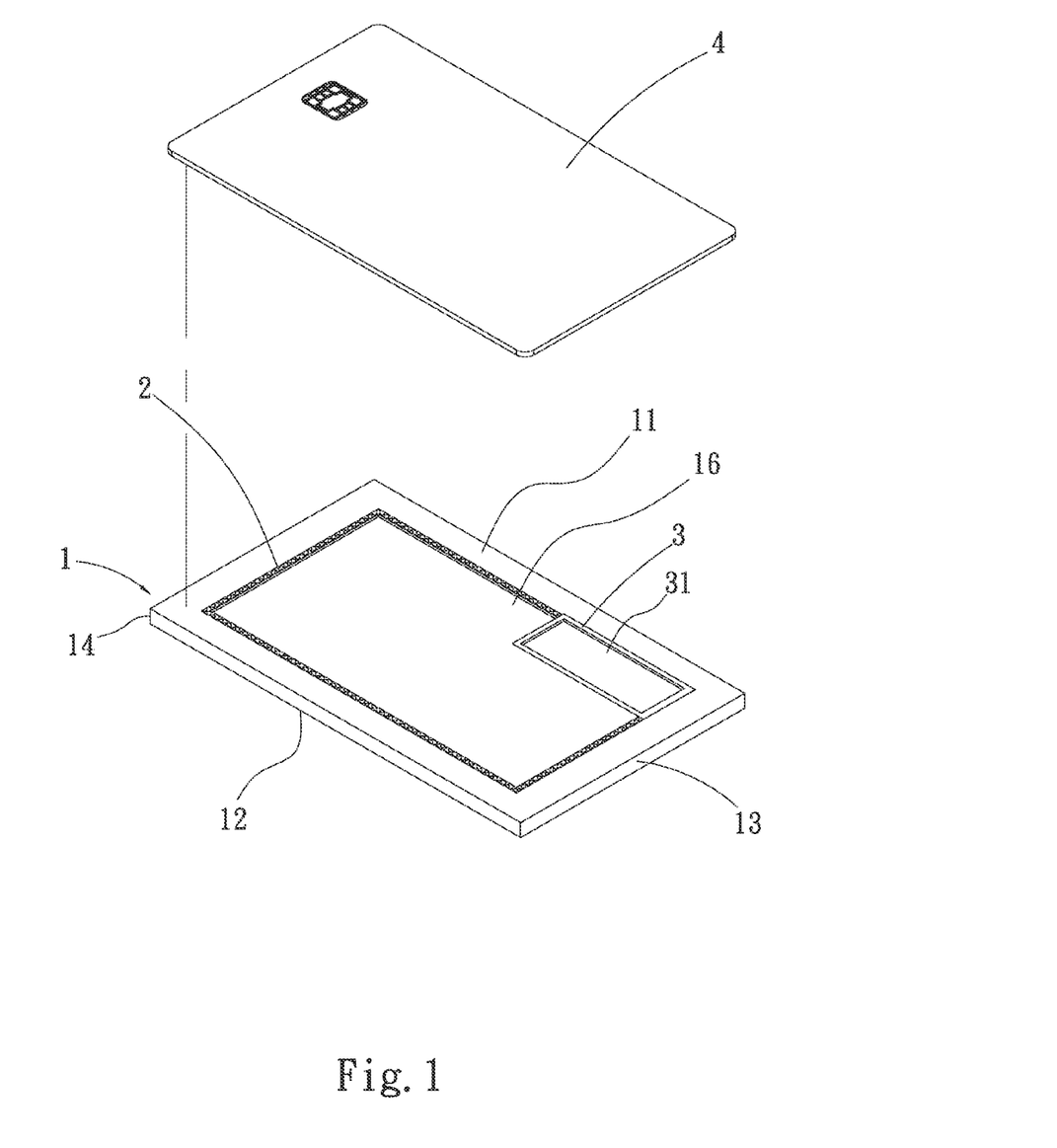
FIG. 1 is an exploded perspective view of a protective cover with information display function according to a first preferred embodiment of the present invention.
Figure 3A:
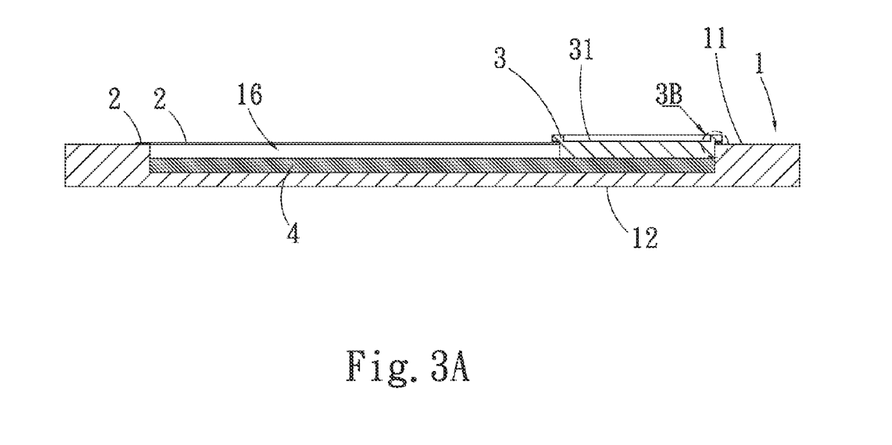
FIG. 3A is a sectional view of FIG. 2.

According to the first embodiment of the present invention, the opening 16 can be formed on one side of the main body 1 in three different manners. In the first opening forming manner as shown in FIGS. 1 and 3A, the opening 16 is formed on and sunk from the first side 11 toward the opposite second side 12 of the main body 1 without penetrating through the second side 12, so that an object 4, which is to be protectively covered by the protective cover and is herein briefly referred to as the object 4, can be fitted into the opening 16 from the first side 11. The object 4 can be a portable card, such as a rapid transit card, a cash card or a merchandise card; or a portable electronic product, such as a cell phone, a tablet computer or an MP3 player.

Figure 4:
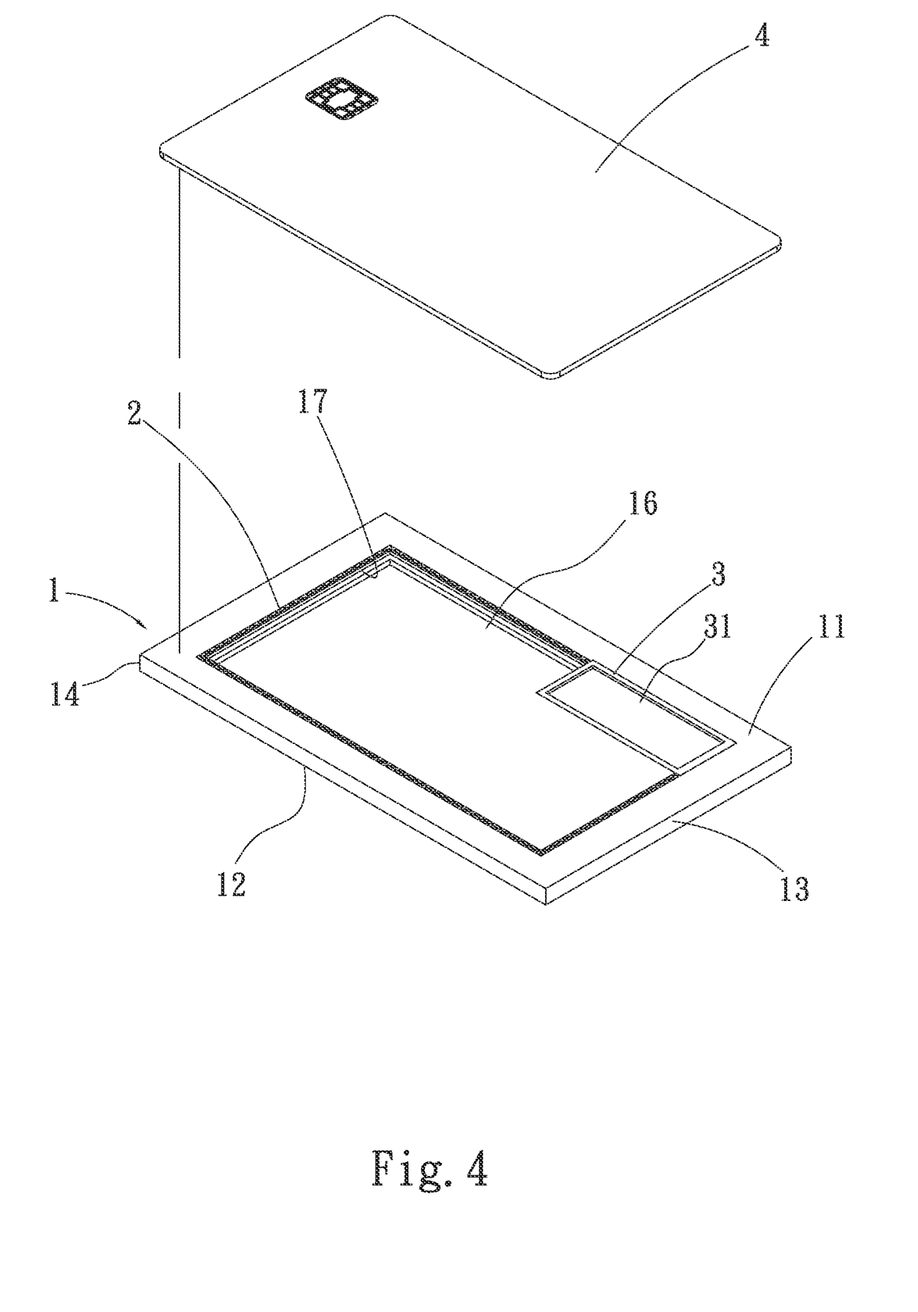
FIG. 4 is an exploded perspective view of a first variant of the first preferred embodiment of the present invention.

In the second opening forming manner as shown in FIG. 4, the opening 16 is formed on and sunk from the first side 11 to penetrate the opposite second side 12. In a first variant of the first embodiment that adopts the second opening forming manner to form the opening 16 on the main body 1, the main body 1 further includes a groove 17 provided between the first side 11 and the second side 12 to adjoin and communicate with the opening 16, so that the object 4 can be fitted into the opening 16 from either the first side 11 or the second side 12 to engage with the groove 17 and be safely covered by the main body 1 of the protective cover.

Figure 5:
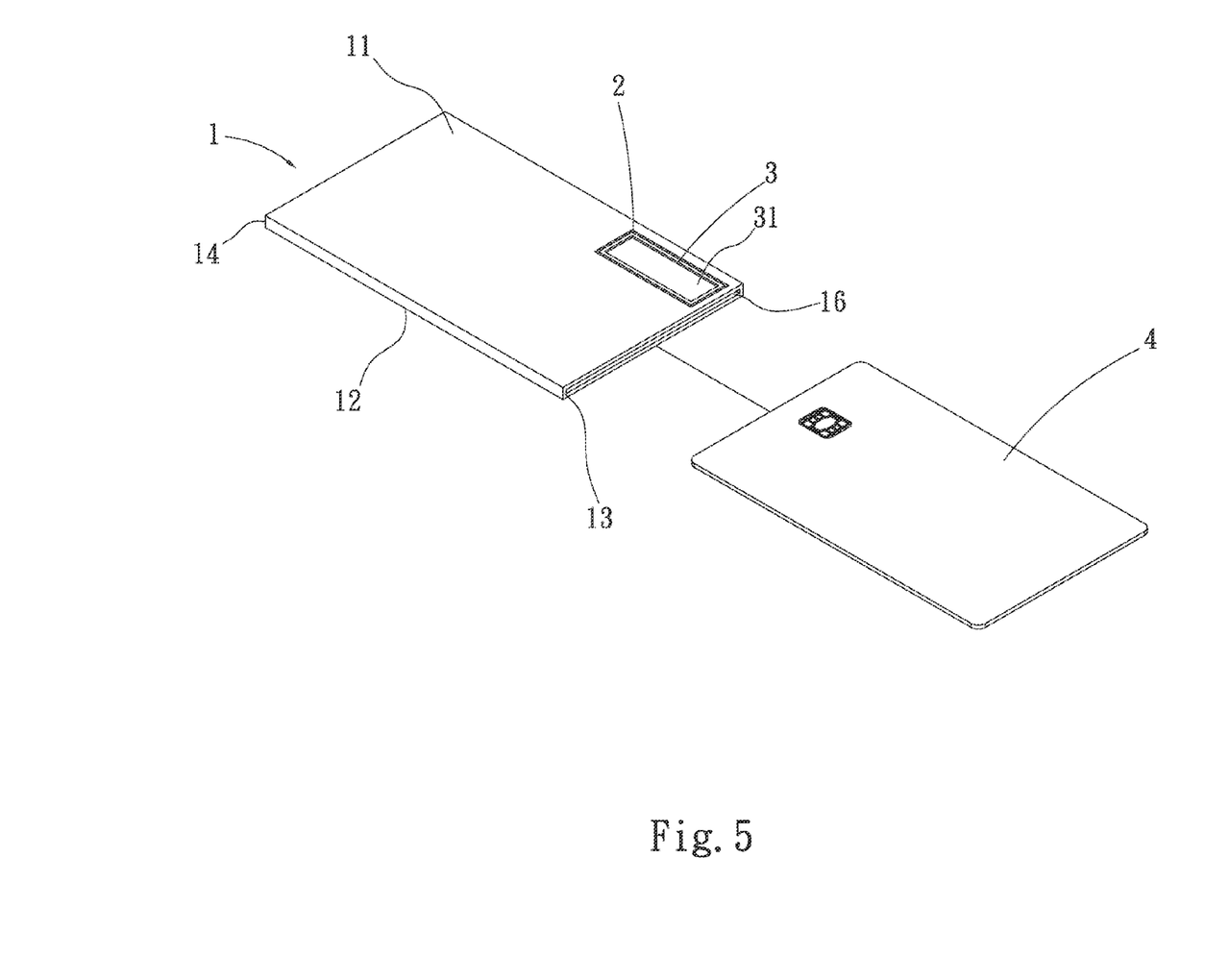
FIG. 5 is an exploded perspective view of a second variant of the first preferred embodiment of the present invention.

In the third opening forming manner as shown in FIG. 5, the opening 16 is formed on and sunk from the third side 13 of the main body 1 without penetrating through the opposite fourth side 14. In a second variant of the first preferred embodiment that adopts the third opening forming manner, the object 4 can be fitted into the opening 16 from the third side 13 to be safely covered by the main body 1.

Figure 7:
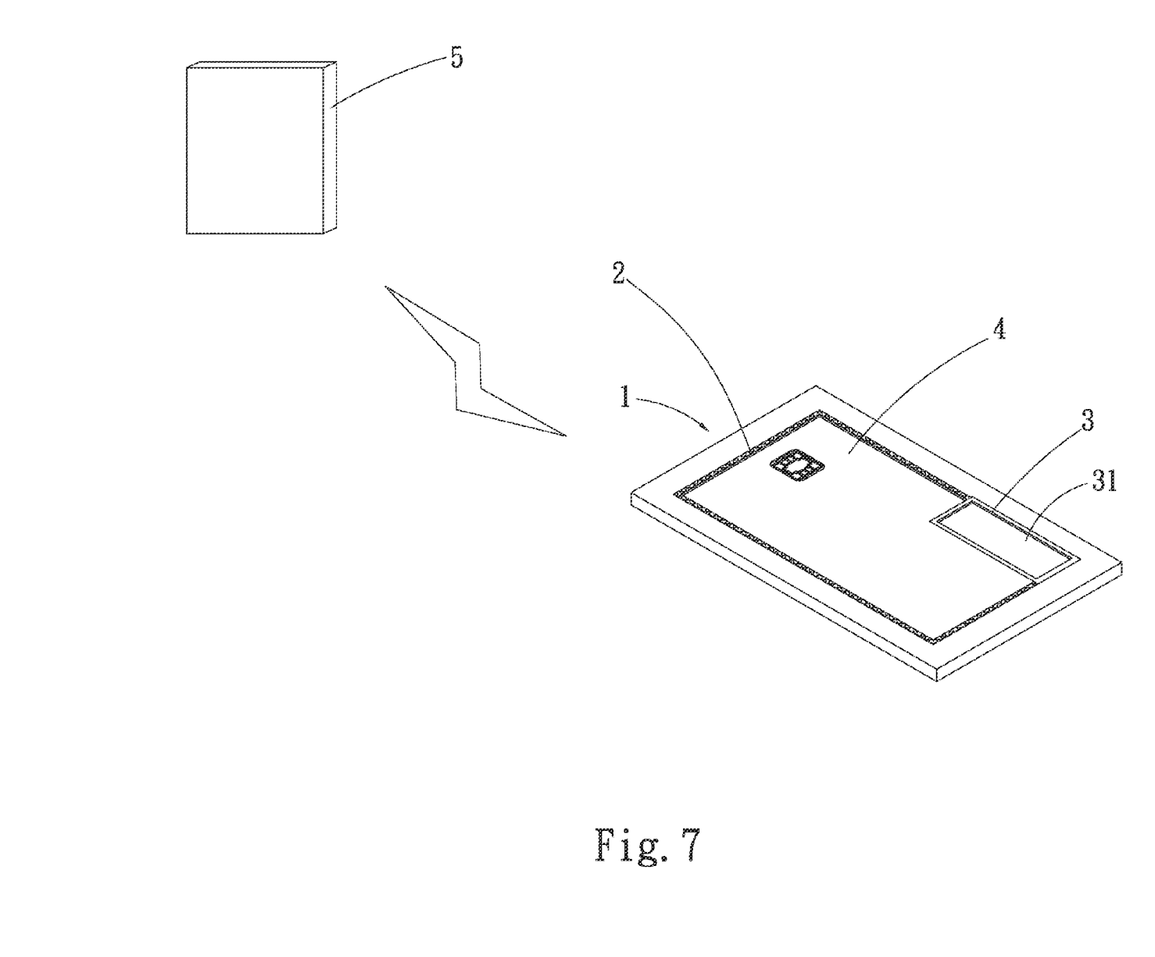
FIG. 7 is a conceptual view showing the protective cover with information display function according to the first preferred embodiment of the present invention in use.

FIG. 7 shows the protective cover of the present invention in use. Please refer to FIGS. 1 and 7 at the same time. The receiving unit 2 is an antenna being provided on the main body 1. In the illustrated first preferred embodiment, the receiving unit 2 is provided on the first side 11 of the main body 1. However, it is understood the receiving unit 2 can be otherwise provided on any other side of the main body 1. The receiving unit 2 is wirelessly connected to an external interface 5 for receiving an electromagnetic wave transmitted from the external interface 5.

The electromagnetic wave transmits graphic signal and electric energy. The receiving unit 2 receives the electric energy and the graphic signal transmitted by the electromagnetic wave and further transmits the same to the e-paper 3, so that the e-paper 3 is driven by the electric energy to display information according to the received graphic signal. The information can be an advertisement or some kind of notice informing the user of, for example, a rapid transit stop operation notice, a ticket discount, or any other promotional activity.

Figure 2:
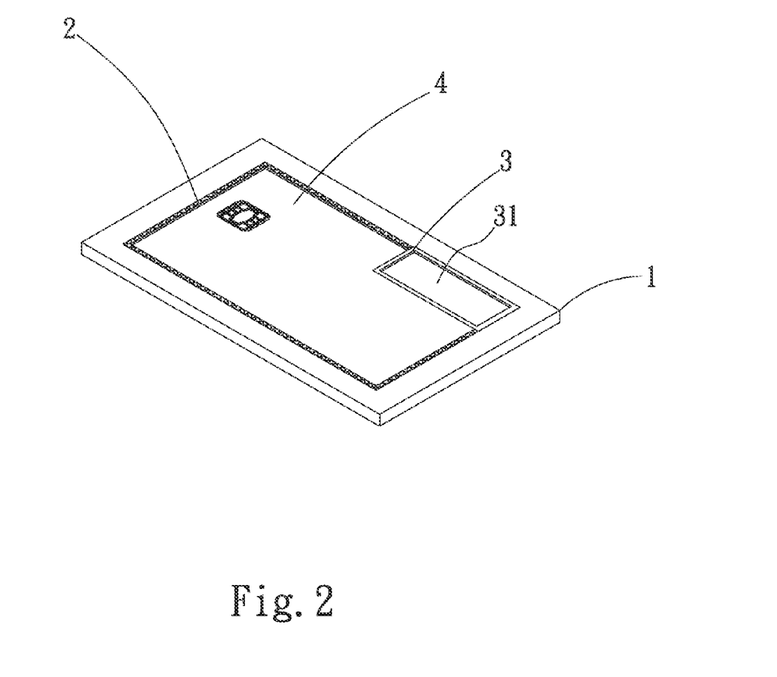
FIG. 2 is an assembled view of FIG. 1.
Figure 3B:
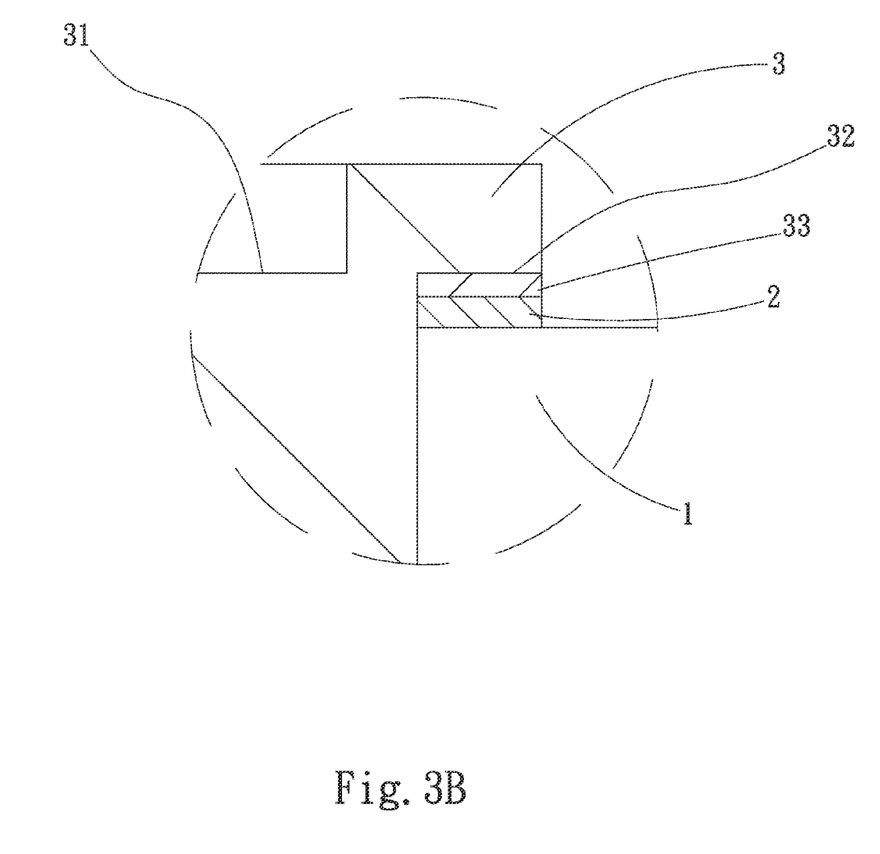
FIG. 3B is an enlarged view of the circled area of FIG. 3A.

According to the present invention, the e-paper 3 can be selectively provided on the main body 1 or on the receiving unit 2. In the first preferred embodiment as shown in FIGS. 2 and 3A, the e-paper 3 is provided on and electrically connected to the receiving unit 2. Please refer to FIGS. 2, 3A and 3B at the same time. FIG. 3B is an enlarged view of the circled area of FIG. 3A. As shown, the e-paper 3 has a display side 31, on which information is displayed; and an opposite bonding side 32, at where the e-paper 3 is detachably adhered to the receiving unit 2. That is, the e-paper 3 can be repeatedly removably adhered to the receiving unit 2.

The bonding side 32 of the e-paper 3 has a layer of electrically conductive adhesive 33 applied thereon. That is, the electrically conductive adhesive 33 has one side adhered to the bonding side 32 of the e-paper 3 and another opposite side adhered to the receiving unit 2, so as to electrically connect the e-paper 3 to the receiving unit 2.

Figure 6A:
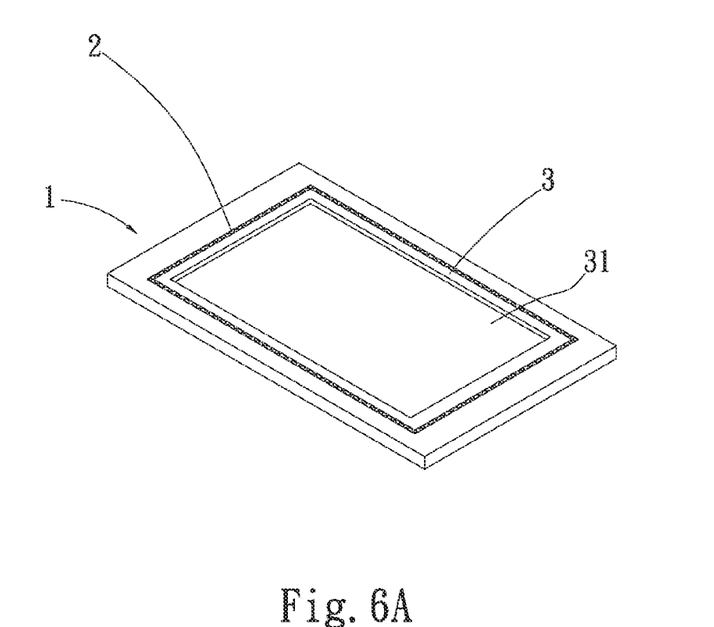
FIG. 6A is an assembled perspective view of a third variant of the first preferred embodiment of the present invention.
Figure 6B:
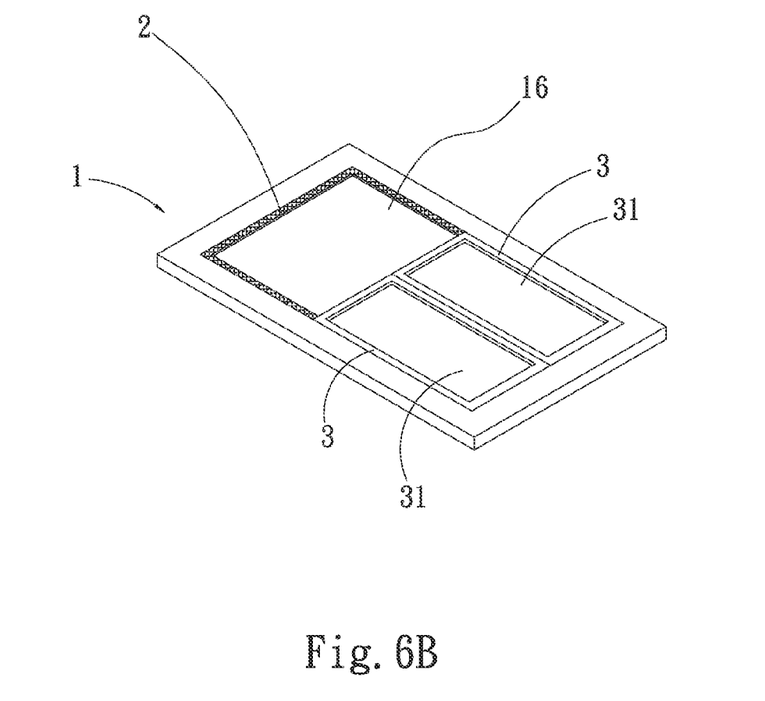
FIG. 6B is an assembled perspective view of a fourth variant of the first preferred embodiment of the present invention.

In practical implementation of the present invention, more than one sheet of e-paper 3 can be detachably adhered to the main body 1 or the receiving unit 2 by a user according to different requirements, such as the number of advertisements to be displayed, the aesthetic appearance of the protective cover, or the convenience in use. For instance, in the first preferred embodiment shown in FIG. 1, one sheet of e-paper 3 is adhered to the receiving unit 2 to cover a part of the opening 16; in a third variant of the first preferred embodiment of the present invention shown in FIG. 6A, one sheet of e-paper 3 is adhered to the receiving unit 2 to cover a whole area of the opening 16; and in a fourth variant of the first preferred embodiment shown in FIG. 6B, two sheets of e-paper 3 are adhered to the receiving unit 2 to cover a part of the opening 16.

An example of use of the protective cover of the present invention is now described with reference to FIGS. 2 and 7. When a user at a rapid transit station carries an object 4, such as a rapid transit card, which is fitted in the protective cover of the present invention, the receiving unit 2 provided on the main body 1 of the protective cover can receive in real time an electromagnetic wave transmitted by an external interface 5 located in the rapid transit station and then transmits the received electromagnetic wave to the e-paper 3. The e-paper 3 is then driven by the electric energy of the received electromagnetic wave to display some advertisement or notice according to the graphic signal transmitted by the electromagnetic wave. The advertisement can be related to, for example, some promotional price of some merchandise or some discount hotel rate; and the notice can be, for example, a notice of stop operation or technical disorder condition of a certain rapid transit station, a notice of discount ticket rate, or any other important message.

According to the technical characteristics of the e-paper 3, the displayed advertisement or notice can remain on the e-paper 3 for reading by the user until the receiving unit 2 receives another electromagnetic wave transmitted from the external interface 5 at the rapid transit station or from some other different external interface 5, such as an external interface 5 provided by a convenience store or a movie theater. At this point, the newly received advertisement or notice will be displayed on the display side 31 of the e-paper 3 to replace the previous one. Therefore, the information displayed on the display side 31 of the e-paper 3 can be effectively updated at any time to effectively upgrade the advertising effect and ensure the provision of the newest information at reduced operating cost.

Figure 8A:
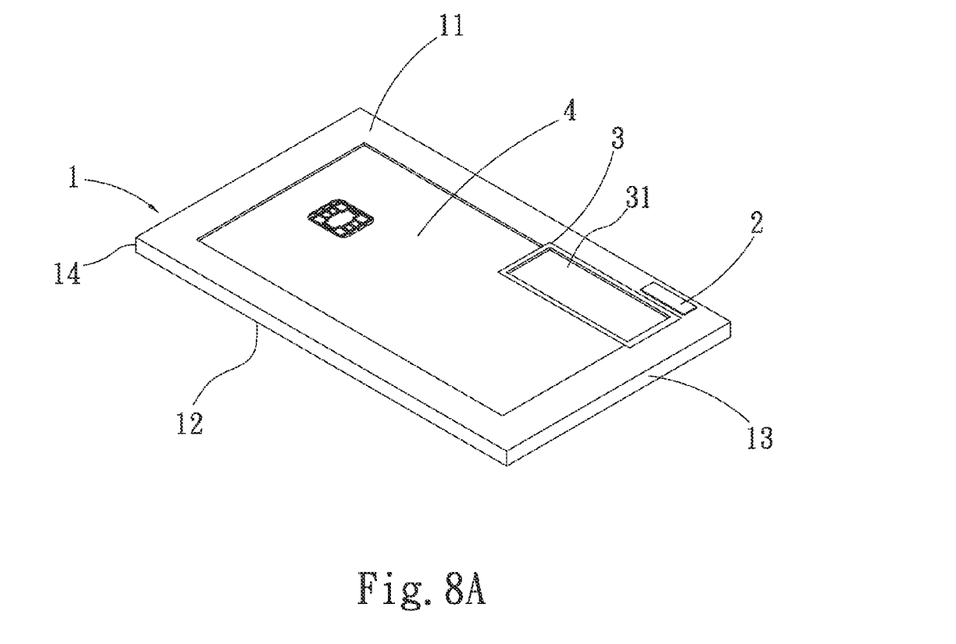
FIG. 8A is an assembled perspective view of a protective cover with information display function according to a second preferred embodiment of the present invention.
Figure 8B:
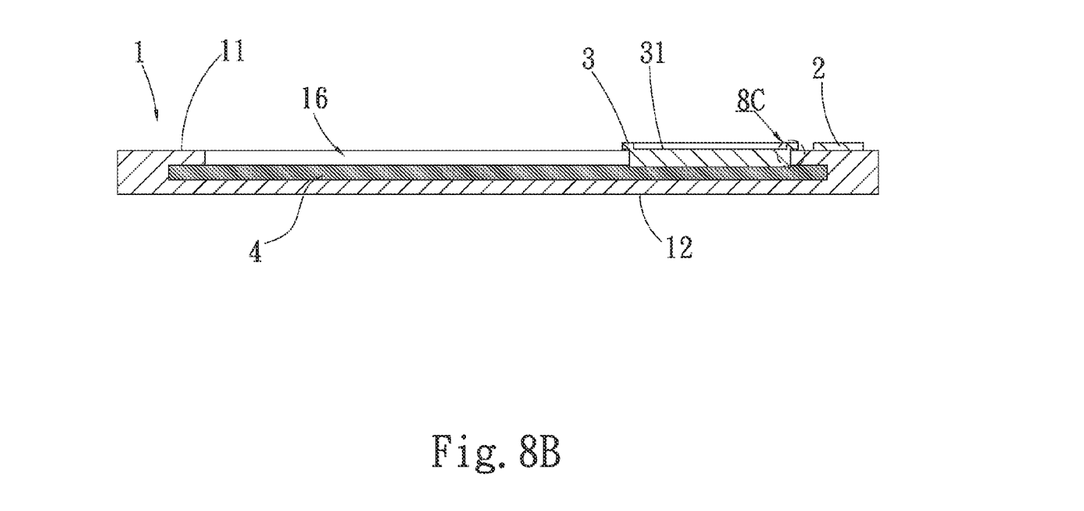
FIG. 8B is a sectional view of FIG. 8A.
Figure 8C:
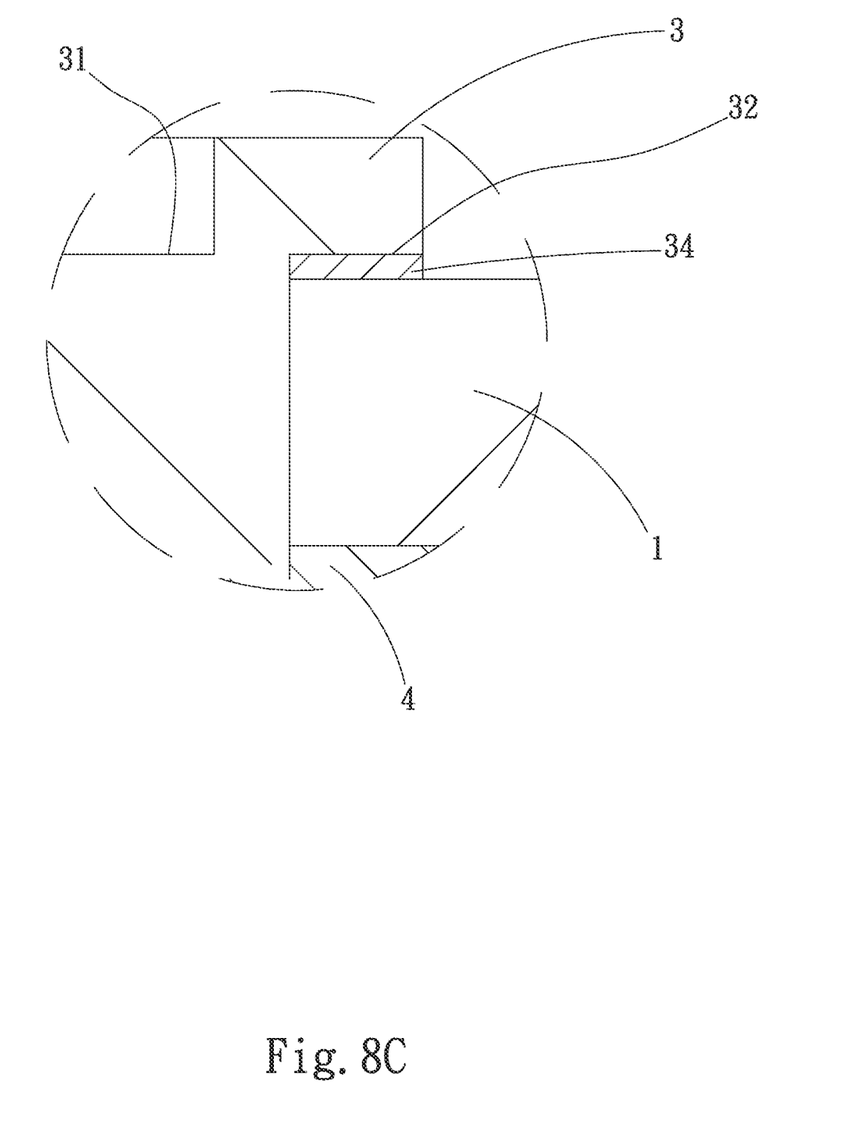
FIG. 8C is an enlarged view of the circled area of FIG. 8B.
Figure 9A:
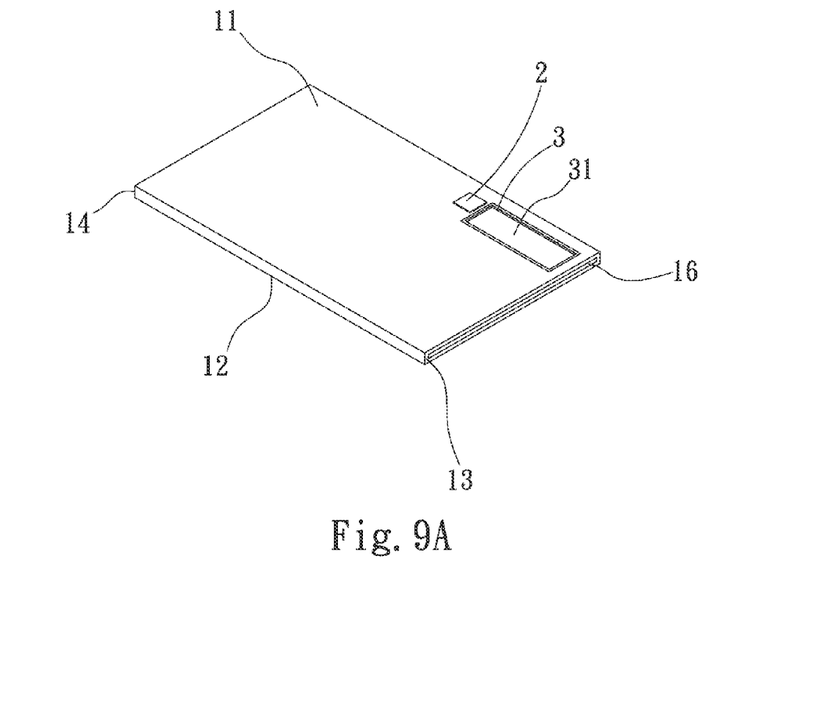
FIG. 9A is an assembled perspective view of a variant of the second preferred embodiment of the present invention.
Figure 9B:
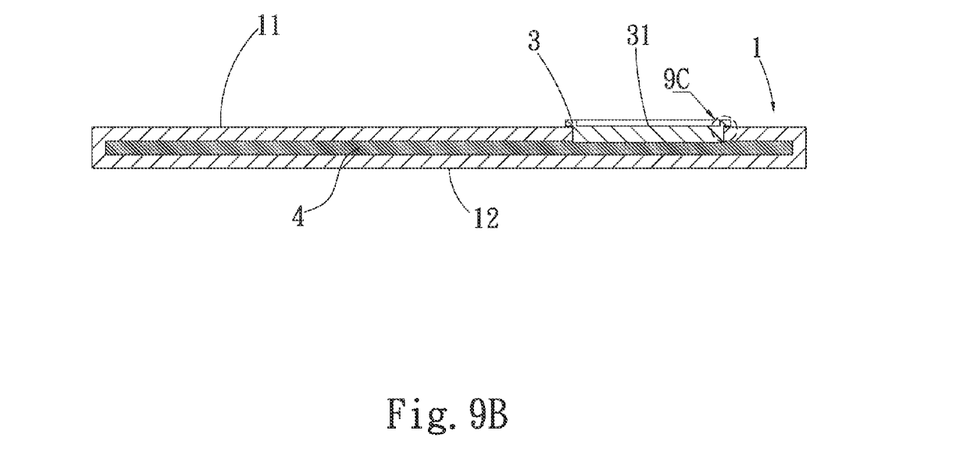
FIG. 9B is a sectional view of FIG. 9A.
Figure 9C:
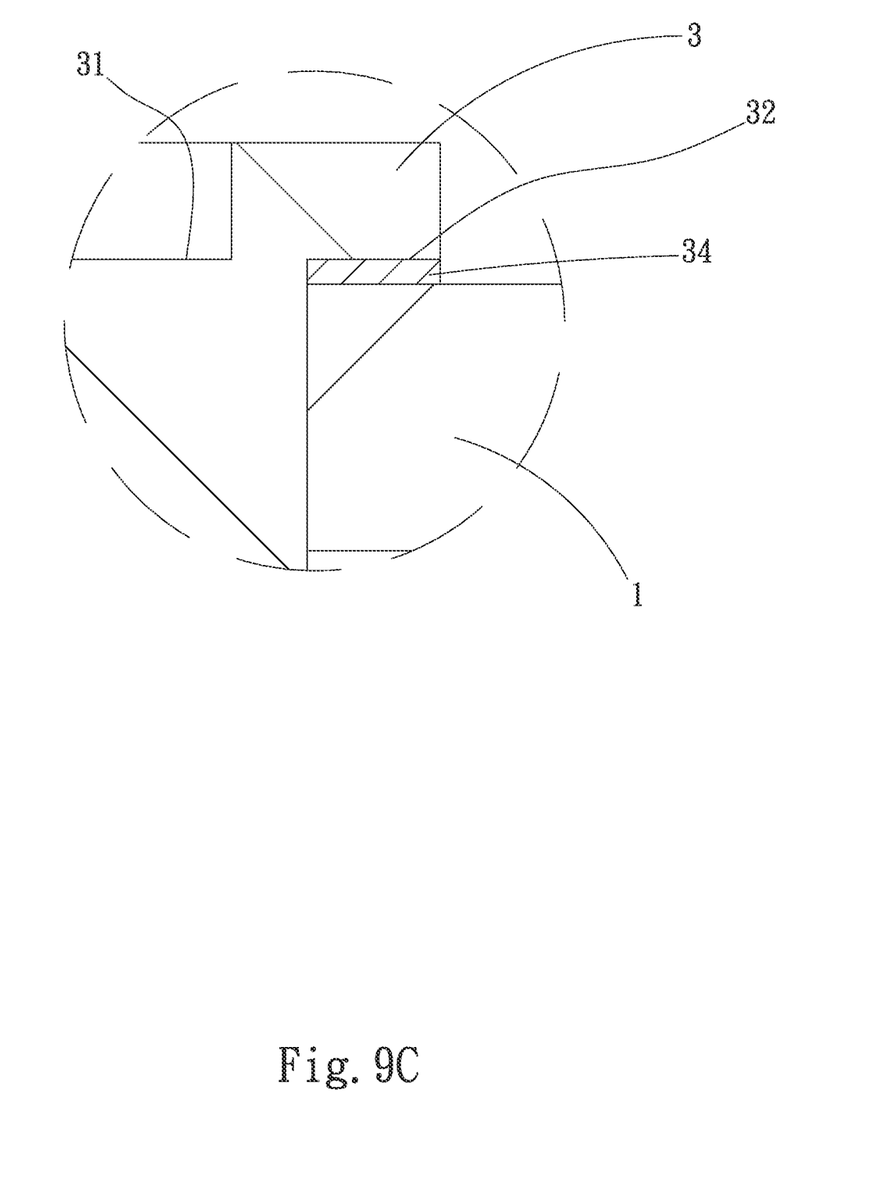
FIG. 9C is an enlarged view of the circled area of FIG. 9B.

FIGS. 8A and 8B are assembled perspective and cross sectional views, respectively, of a protective cover with information display function according to a second preferred embodiment of the present invention, and FIG. 8C is an enlarged view of the circled area of FIG. 8B. FIGS. 9A and 9B are assembled perspective and cross sectional views, respectively, of a variant of the second preferred embodiment of the present invention, and FIG. 9C is an enlarged view of the circled area of FIG. 9B. As shown, the second preferred embodiment and the variant thereof are generally structurally similar to the first preferred embodiment, except that the e-paper 3 thereof is removably adhered at the bonding side 32 to the main body 1 and a layer of adhesive 34 instead of the electrically conductive adhesive 33 is applied on the bonding side 32. That is, in the second preferred embodiment, the e-paper 3 is repeatedly removably adhered to the main body 1, and the adhesive 34 has one side adhered to the bonding side 32 of the e-paper 3 and another opposite side to the main body 1 to thereby connect the e-paper 3 to the main body 1. The e-paper 3 in the second preferred embodiment is electrically connected via a conductor (not shown) to the receiving unit 2, which is located adjacent to or nearby the e-paper 3.

In the second preferred embodiment and the variant thereof, the receiving unit 2 is shown as being provided on the first side 11 of the main body 1. However, it is understood, in practical implementation of the present invention, the receiving unit 2 can be otherwise provided inside the main body 1 or on any other side of the main body 1 according to different requirements, such as the signal receiving capability of the receiving unit or the convenience in assembling the receiving unit to the main body. In the second preferred embodiment shown in FIGS. 8A to 8C, the opening 16 is formed on the first side 11 of the main body 1; and in the variant of the second embodiment shown in FIGS. 9A to 9C, the opening 16 is formed on and sunk from the third side 13 of the main body 1.

In conclusion, the protective cover of the present invention provides the following advantages: (1) enabling enhanced advertising effect; (2) capable of providing the user with real-time information; and (3) providing real-time advertisement and notice at reduced cost.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A protective cover with information display function, comprising:
    a main body having an opening, a first side, a second side, a third side and a fourth side, the first side and the second side being opposite to each other, the third side and the fourth side being opposite to each other, the opening being formed on and sunk from the first side toward the second side without penetrating through the second side, so that an object can be fitted into the opening from the first side to be covered by the main body;
    at least one receiving unit being provided on the main body; and
    at least one sheet of e-paper being selectively provided on one of the main body and the receiving unit, and being electrically connected to the receiving unit for displaying at least one piece of information; and
    wherein the e-paper has a display side, on which information is displayed, and an opposite bonding side, at where the e-paper is repeatedly removably adhered to the receiving unit; the bonding side having a layer of electrically conductive adhesive applied thereon, and the electrically conductive adhesive having one side adhered to the bonding side and another opposite side to the receiving unit to electrically connect the e-paper to the receiving unit.

2. The protective cover with information display function as claimed in claim 1, wherein the receiving unit is an antenna being wirelessly connected to an external interface for receiving an electromagnetic wave transmitted from the external interface and for transmitting the received electromagnetic wave to the e-paper.

3. The protective cover with information display function as claimed in claim 1, wherein the object is selected from the group consisting of a portable card and a portable electronic product.

4. The protective cover with information display function as claimed in claim 1, wherein the main body is made of a polymeric material.

5. A protective cover with information display function comprising:
    a main body having an opening, a first side, a second side, a third side and a fourth side, the first side and the second side being opposite to each other, the third side and the fourth side being opposite to each other, the opening being formed on and sunk from the first side to penetrate through the second side;
    at least one receiving unit being provided on the main body; and
    at least one sheet of e-paper being selectively provided on one of the main body and the receiving unit, and being electrically connected to the receiving unit for displaying at least one piece of information;
    wherein the main body further includes a groove provided between the first and the second side to adjoin and communicate with the opening, so that an object can be fitted into the opening to engage with the groove; and
    wherein the e-paper has a display side, on which information is displayed, and an opposite bonding side, at where the e-paper is repeatedly removably adhered to the receiving unit; the bonding side having a layer of electrically conductive adhesive applied thereon, and the electrically conductive adhesive having one side adhered to the bonding side and another opposite side to the receiving unit to electrically connect the e-paper to the receiving unit.

6. The protective cover with information display function as claimed in claim 5, wherein the receiving unit is an antenna being wirelessly connected to an external interface for receiving an electromagnetic wave transmitted from the external interface and for transmitting the received electromagnetic wave to the e-paper; the object being selected from the group consisting of a portable card and a portable electronic product; the main body being made of a polymeric material.

7. A protective cover with information display function comprising:
    a main body having an opening, a first side, a second side, a third side and a fourth side, the first side and the second side being opposite to each other the third side and the fourth side being opposite to each other, the opening being formed on and sunk from the third side toward the fourth side, so that an object can be fitted into the opening;
    at least one receiving unit being provided on the main body; and
    at least one sheet of e-paper being selectively provided on one of the main body and the receiving unit, and being electrically connected to the receiving unit for displaying at least one piece of information;
    wherein the e-paper has a display side, on which information is displayed, and an opposite bonding side, at where the e-paper is repeatedly removably adhered to the receiving unit; the bonding side having a layer of electrically conductive adhesive applied thereon, and the electrically conductive adhesive having one side adhered to the bonding side and another opposite side to the receiving unit to electrically connect the e-paper to the receiving unit.

8. The protective cover with information display function as claimed in claim 7, wherein the receiving unit is an antenna being wirelessly connected to an external interface for receiving an electromagnetic wave transmitted from the external interface and for transmitting the received electromagnetic wave to the e-paper; the object being selected from the group consisting of a portable card and a portable electronic product; the main body being made of a polymeric material.

9. A protective cover with information display function comprising:
   a main body having an opening formed on and sunk from one side thereof;
   at least one receiving unit being provided on the main body; and
   at least one sheet of e-paper being selectively provided on one of the main body and the receiving unit, and being electrically connected to the receiving unit for displaying at least one piece of information;
   wherein the e-paper has a display side, on which information is displayed, and an opposite bonding side, at where the e-paper is repeatedly removably adhered to the main body; and the bonding side being electrically connected to the receiving unit via a conductor.

10. The protective cover with information display function as claimed in claim 9, wherein the receiving unit is an antenna being wirelessly connected to an external interface for receiving an electromagnetic wave transmitted from the external interface and for transmitting the received electromagnetic wave to the e-paper; the object being selected from the group consisting of a portable card and a portable electronic product; the main body being made of a polymeric material.

11. A protective cover with information display function comprising:
   a main body having an opening, a first side, a second side, a third side and a fourth side, the first side and the second side being opposite to each other, the third side and the fourth side being opposite to each other, the opening being formed on and sunk from the first side toward the second side without penetrating through the second side, so that an object can be fitted into the opening from the first side to be covered by the main body;
   at least one receiving unit being provided on the main body; and
   at least one sheet of e-paper being selectively provided on one of the main body and the receiving unit, and being electrically connected to the receiving unit for displaying at least one piece of information;
   wherein the e-paper has a display side, on which information is displayed, and an opposite bonding side, at where the e-paper is repeatedly removably adhered to the main body;
   and the bonding side being electrically connected to the receiving unit via a conductor.

12. A protective cover with information display function comprising:
   a main body having an opening, a first side, a second side, a third side and a fourth side, the first side and the second side being opposite to each other, the third side and the fourth side being opposite to each other, the opening being formed on and sunk from the third side toward the fourth side, so that an object can he fitted into the opening;
   at least one receiving unit being provided on the main body; and
   at least one sheet of e-paper being selectively provided on one of the main body and the receiving unit, and being electrically connected to the receiving unit for displaying at least one piece of information;
   wherein the e-paper has a display side, on which information is displayed, and an opposite bonding side, at where the e-paper is repeatedly removably adhered to the main body; and the bonding side being electrically connected to the receiving unit via a conductor.

* * * * *